Figure 1:
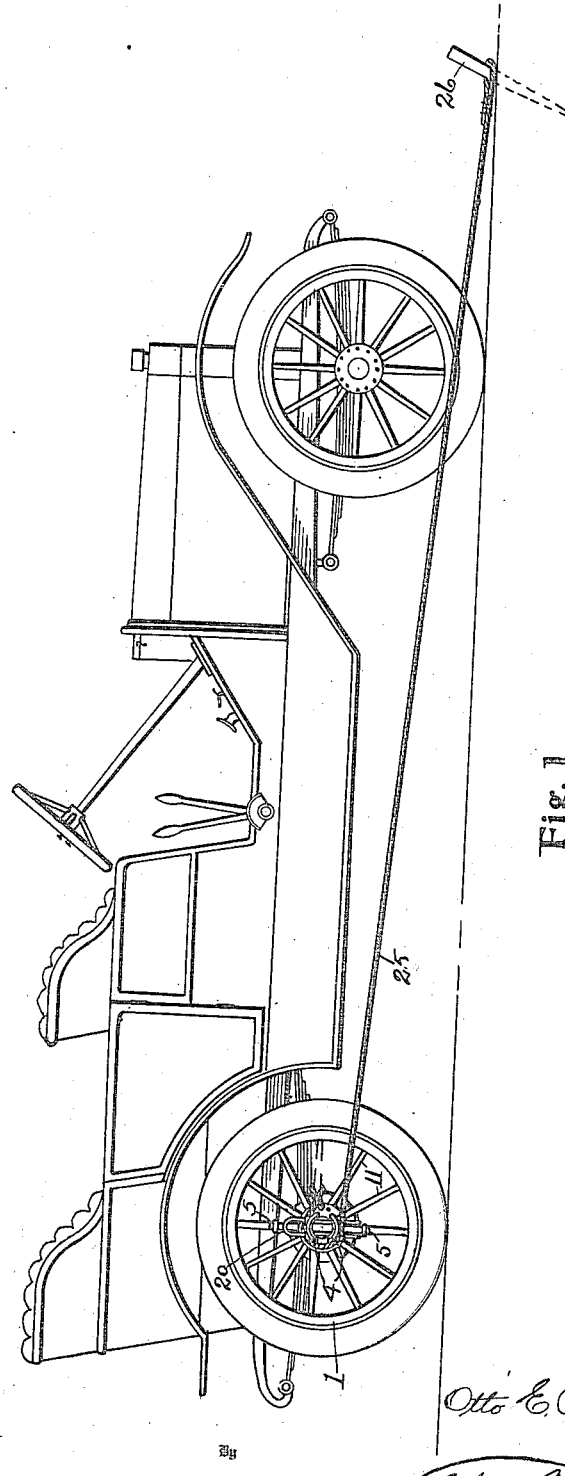

O. E. RITZMANN.
DRAFT ATTACHMENT FOR MOTOR VEHICLES.
APPLICATION FILED APR. 29, 1910.
971,075.
Patented Sept. 27, 1910.
2 SHEETS—SHEET 2.
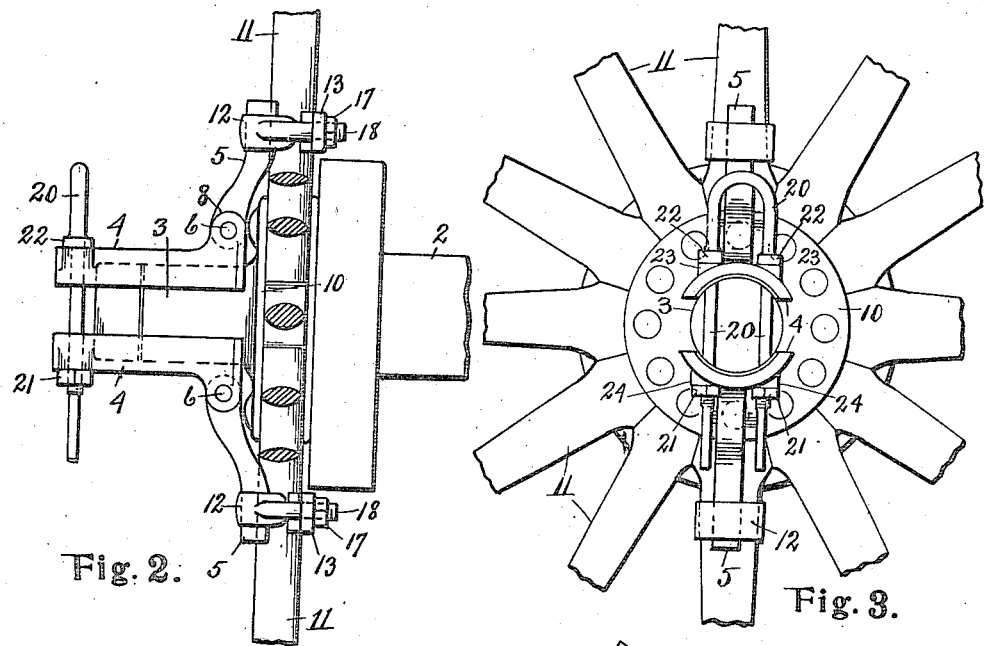
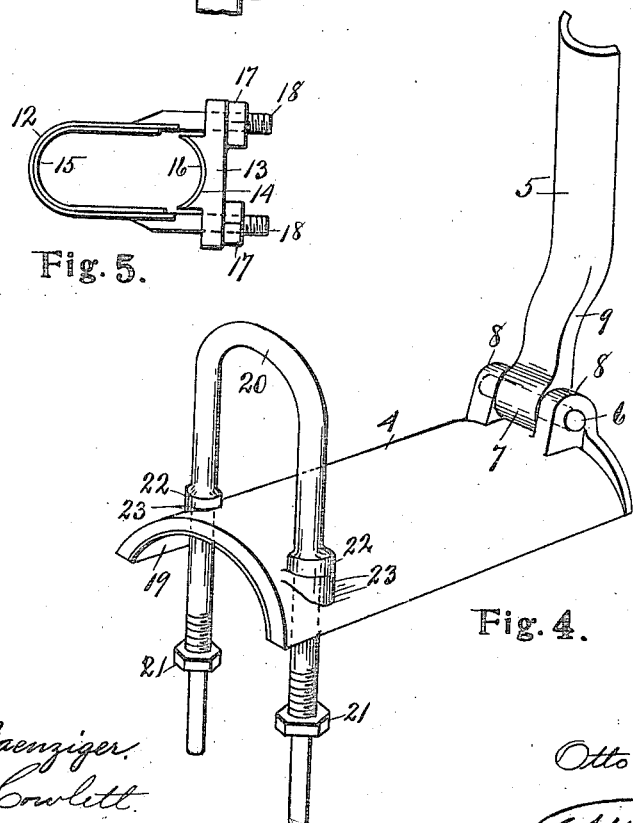
Witnesses
O. B. Baenziger
I. G. Howlett
Inventor
Otto E. Ritzmann
E. S. Wheeler
Attorney

UNITED STATES PATENT OFFICE.

OTTO E. RITZMANN, OF DETROIT, MICHIGAN, ASSIGNOR TO PEERLESS AUTO PULL CO., OF DETROIT, MICHIGAN, A CORPORATION OF MICHIGAN.

DRAFT ATTACHMENT FOR MOTOR-VEHICLES.

971,075.  Specification of Letters Patent.  Patented Sept. 27, 1910.

Application filed April 29, 1910. Serial No. 558,327.

*To all whom it may concern:*

Be it known that I, OTTO E. RITZMANN, a citizen of the United States, residing at Detroit, in the county of Wayne, State of Michigan, have invented certain new and useful Improvements in Draft Attachments for Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a draft attachment for motor vehicles, and consists in the construction and arrangement of parts hereinafter more fully set forth and pointed out particularly in the claims.

The object of the invention is to provide simple and efficient means adapted to be detachably secured to the hub of the drive wheel of a motor vehicle, whereby a rope or cable may be wound thereon for the purpose of drawing the vehicle out of a rut in the road, or for moving it onto hard ground when stalled in the mud.

The above object is attained by the device illustrated in the accompanying drawings, in which:—

Figure 1 is a general view, showing the application of my invention to the hub of the rear or drive wheel of an automobile. Fig. 2 is a fragmentary view in elevation looking at the side of the hub, showing my draft device mounted upon and coöperating with the hub of the drive wheel of a motor vehicle. Fig. 3 is an elevation of the parts shown in Fig. 2, looking at the end of the hub. Fig. 4 is a perspective view of one of the sector plates with its hinged arm attached to the inner end thereof, and with the clamping bail passed through the outer end of said plate. Fig. 5 is an elevation of the clip employed to clamp the arm of the sector plate to the hub of the wheel.

Referring to the characters of reference, 1 designates the drive wheel of a motor vehicle mounted in the usual manner upon the rear axle 2 and carrying the customary extension hub 3. To afford a winding drum which may be mounted on said hub in a manner to coöperate therewith to wind thereon one end of a rope or cable, whose opposite end is attached to a fixed support, I employ a plurality of sector plates 4 which are concavo-convex in cross section, being curved to coincide with and embrace a portion of the periphery of the hub 3. In the application of my invention illustrated herein, I have shown two of said plates, each of which has attached thereto an arm 5 pivoted to the inner end thereof upon a pin 6 passing through an eye 7 at the end of said arm and through the parallel ears 8 formed integral with said plate, and between which said eye is received. Each of said arms 5 adjacent its point of hinged connection with the plate 4 is provided with a bend 9 to allow it to clear the flange 10 of the hub and permit its outer end to lie parallel with the spoke 11 of the wheel to which it is attached.

In order to provide for firmly securing the free ends of the arms 5 to the spokes of the wheel, the outer portions of said arms are curved to partially embrace the rounded portion of said spokes, whereby a relatively lateral movement between said parts when secured together, is obviated. To clamp the hinged arms securely to the spokes, the clips 12 are employed which embrace the arms and spokes and whose threaded terminals pass through the apertured ends of the cross bars 13 which slide upon the terminals of said clips and are provided with a concaved face 14 to fit the contour of the spokes. In order to prevent marring the spokes of the wheel the clips 12 are provided with a lining 15 of leather, or analogous material, and the curved faces 14 of the clips 12 are provided with a similar lining 16. To bind the clips 12 securely in place so as to fasten the arms 5 firmly to the spokes, nuts 17 are screwed onto the threaded terminals 18 of the clips and against the outer face of the cross bars 13, as clearly shown in Fig. 5.

As before stated, the sector plates 4 embrace the periphery of the hub and lie in contact therewith, and to prevent any abrasive action of said plates thereon, they are lined with non-abrasive material 19, as clearly shown in Fig. 4. The outer ends of the plates 4 project beyond the end of the hub and are fastened together, and at the same time clamped to the hub by means of the yoke 20 whose parallel terminals pass through registering apertures in the free ends of said plates and receive the nuts 21 which are threaded thereto. To prevent the yoke being drawn through the plates by the action of the screws 21, the looped end thereof is provided with the shoulders 22 adapted to bear upon the flat faces of the bosses 23 around the openings in the plate through which said yoke passes, the nuts 21 upon the free ends of said yoke screwing against the bosses 24 which surround the openings in the plate through which the free ends of said yoke pass, thereby enabling said yoke to exert a clamping action upon the plates to bind them to the hub when the nuts 21 are tightened. The projecting ends of the yoke 20 act as a guard or flange to prevent the rope or cable 25 slipping off of the outer end of the plates during the operation of winding said rope thereon.

In the application of my invention after the sector plates have been attached to the hub, as before described, one end of the rope 25 is made fast to a stake 26, or other fixed support, and the opposite end wrapped around the segmental drum on the hub formed by the plates 4, the end of the rope being then secured to one of the spokes of the wheel, as shown in Fig. 1. When the parts are so positioned, a rotation of the rear or drive wheel by the application of the power of the motor thereto, will cause the rope 25 to wind upon the drum on the hub thereof and draw the car forward, as will be well understood. By this arrangement the power of the motor may be utilized to extract the car when stalled in the mud, under circumstances where the drive wheels have not sufficient traction to move the car forward.

By hinging the arms 5 to the sector plates 4, said arms may be swung into contact with said plates, thereby enabling the parts to be more conveniently placed in a tool box.

It will be noted that the arrangement is such as to enable the parts to be readily attached to a hub when required, and easily and quickly removed.

Having thus fully set forth my invention, what I claim as new and desire to secure by Letters Patent, is:—

1. The combination with the hub and drive wheel of a motor vehicle, of a plurality of sector plates embracing said hub and coöperating therewith to form a segmental winding drum, means for attaching the inner ends of the sector plates to the wheel, and means for clamping the outer ends of said plates to the hub.

2. The combination with the drive wheel of a motor vehicle, of a plurality of sector plates embracing the hub of said wheel and coöperating therewith to form a winding drum, each of said plates having an arm adapted to lie parallel with a spoke of the wheel, means for clamping said arms to said spokes, and means for clamping said plates to the hub.

3. The combination with the drive wheel of a motor vehicle, of a segmental drum adapted to embrace the hub of said wheel and coöperate therewith to form a winding drum, each part of said drum having an arm hinged thereto adapted to lie parallel with a spoke of the wheel, means for clamping said arms to said spokes, and means for fastening the parts of said drum to the hub.

4. A segmental drum for the hub of a drive wheel, comprising a plurality of sector plates adapted to embrace said hub, each plate having means for attachment to the wheel, and a clamping yoke passing through said plates for clamping them upon the hub.

5. A winding drum for the hub of a drive wheel, comprising a plurality of sector plates, arms on said plates adapted for attachment to the spokes of the drive wheel, a clamping yoke passing through said plates for clamping them upon the hub, the end of said yoke projecting beyond the periphery of said plates to serve as a guard or flange for the rope which is wound on said drum.

6. A segmental drum for attachment to the hub of a drive wheel, comprising sector plates, each plate having a hinged arm attached to one end thereof and adapted to be coupled to the hub of a wheel, and a clamping yoke passing through the outer ends of said plates and having terminal portions projecting beyond the periphery thereof.

In testimony whereof, I sign this specification in the presence of two witnesses.

OTTO E. RITZMANN.

Witnesses:
E. S. WHEELER,
I. G. HOWLETT.